United States Patent
Matsubara et al.

(10) Patent No.: US 8,104,374 B2
(45) Date of Patent: Jan. 31, 2012

(54) BELT CONTINUOUSLY-VARIABLE TRANSMISSION

(75) Inventors: Kenji Matsubara, Kanagawa (JP); Hiromi Taguchi, Kanagawa (JP); Yasuhiko Kunii, Kanagawa (JP); Kenji Shimizu, Kanagawa (JP)

(73) Assignee: JATCO Ltd, Fuji-shi (JP)

( * ) Notice: Subject to any disclaimer, the term of this patent is extended or adjusted under 35 U.S.C. 154(b) by 903 days.

(21) Appl. No.: 11/085,012

(22) Filed: Mar. 21, 2005

(65) Prior Publication Data

US 2005/0221928 A1  Oct. 6, 2005

(30) Foreign Application Priority Data

Mar. 31, 2004  (JP) .................. 2004-104065

(51) Int. Cl.
*F16H 57/02* (2006.01)
*B62J 13/04* (2006.01)

(52) U.S. Cl. .............. 74/606 R; 74/606 A; 474/146; 474/148

(58) Field of Classification Search ............. 474/8, 18, 474/28, 144, 146, 148, 150; 74/606 A, 606 R
See application file for complete search history.

(56) References Cited

U.S. PATENT DOCUMENTS

| | | | | |
|---|---|---|---|---|
| 2,145,545 A * | 1/1939 | Johnson et al. | ............ | 474/29 |
| 4,468,979 A * | 9/1984 | Inagaki et al. | ............ | 74/606 R |
| 4,531,928 A * | 7/1985 | Ikenoya | ............ | 474/93 |
| 4,697,665 A * | 10/1987 | Eastman et al. | ............ | 180/230 |
| 4,878,467 A * | 11/1989 | Schmidt | ............ | 123/195 C |
| 4,911,035 A * | 3/1990 | Taguchi | ............ | 74/606 R |
| 5,976,044 A * | 11/1999 | Kuyama | ............ | 474/93 |
| 6,058,969 A * | 5/2000 | Bollwahn et al. | ............ | 137/583 |
| 6,065,369 A * | 5/2000 | Kosuge et al. | ............ | 74/606 R |
| 6,267,700 B1 * | 7/2001 | Takayama | ............ | 474/93 |
| 6,338,688 B1 * | 1/2002 | Minami et al. | ............ | 474/144 |
| 6,454,040 B1 * | 9/2002 | Fukuda | ............ | 180/374 |
| 6,823,956 B2 * | 11/2004 | Shimizu | ............ | 180/68.1 |
| 6,938,676 B2 * | 9/2005 | Lan et al. | ............ | 165/41 |
| 7,059,438 B1 * | 6/2006 | Sheets | ............ | 180/68.1 |
| 7,314,115 B2 * | 1/2008 | Ito et al. | ............ | 184/6.5 |
| 2001/0029215 A1 * | 10/2001 | Ohyama et al. | ............ | 474/148 |
| 2002/0005191 A1 * | 1/2002 | Maeda et al. | ............ | 123/572 |
| 2003/0066696 A1 * | 4/2003 | Nakamura | ............ | 180/68.1 |
| 2008/0000319 A1 * | 1/2008 | Kitamura | ............ | 74/606 A |
| 2008/0041179 A1 * | 2/2008 | Yasui et al. | ............ | 74/467 |

FOREIGN PATENT DOCUMENTS

JP  10-205609 A  8/1998

* cited by examiner

*Primary Examiner* — Bradley King
*Assistant Examiner* — Thomas Irvin
(74) *Attorney, Agent, or Firm* — Foley & Lardner LLP

(57) ABSTRACT

In a belt continuously-variable transmission, a casing or a housing is formed with an air communicating hole extending through an upper part of the casing or the housing. The casing and the housing include inner walls defining an air breather chamber and communicating parts. The air breather chamber is defined in a region located above a joint between the casing and the housing and ranging from an upper side of the second shaft to an upper side of the first shaft and between the second shaft and the first shaft. The communicating parts are defined at a position in the upper side of the first shaft and at a position between the second shaft and the first shaft. The air breather chamber communicates with open air via the air communicating hole, and communicates with an inside part of a casing assembly via each of the communicating parts.

9 Claims, 5 Drawing Sheets

BELT CONTINUOUSLY-VARIABLE TRANSMISSION

BACKGROUND OF THE INVENTION

The present invention generally relates to technique for suppressing a difference in pressure between inside and outside of a belt continuously-variable transmission that transmits rotation of an output shaft of an engine to an axle in a vehicle, and more particularly, to an air breather chamber for a belt continuously-variable transmission.

Japanese Patent Laid-open Publication No. H10(1998)-205609 discloses an air breather chamber for a belt continuously-variable transmission. According to structures mainly shown in FIGS. 2 and 4 of Japanese Patent Laid-open Publication No. H10(1998)-205609, an air breather chamber (104) is provided in a region ranging from an upper side to a lateral side of a second shaft (a through-hole portion 74) and a third shaft (a support portion 76) except a part between the second shaft and the third shaft. A first communicating part (106) and a second communicating part (108) each communicating with an inside part of the belt continuously-variable transmission (or an inside part of a casing assembly including a casing) are formed respectively at a middle portion (the upper side of the third shaft) and a lower end (the lateral side of the third shaft) of the air breather chamber (104). The second communicating part (108) has a function of draining working fluid (normally, in the form of oil), having entered into the air breather chamber (104) from the first communicating part (106), outside from the air breather chamber (104) (or returning the working fluid to the inside part of the casing assembly).

SUMMARY OF THE INVENTION

It is an object of the present invention to provide a belt continuously-variable transmission capable of having a small size by an amount corresponding to the space outside the third shaft, or capable of using the space outside the third shaft effectively.

According to one aspect of the present invention, a belt continuously-variable transmission includes: a transmission mechanism provided on a first shaft coaxial with an engine output shaft, and arranged to transmit rotation of the engine output shaft; a drive pulley provided on the first shaft, located at a non-engine side of the transmission mechanism, and arranged to be driven by an output of the transmission mechanism; a driven pulley provided on a second shaft parallel with the first shaft, and connected with the drive pulley by a belt; an output gear provided on the second shaft, located at an engine side of the driven pulley, and arranged to rotate integrally with the driven pulley; an idler gear provided on a third shaft parallel with the second shaft, and arranged to mesh with the output gear; and a casing assembly housing the transmission mechanism, the drive pulley, the driven pulley, the output gear and the idler gear, and including: a casing; a housing mounted on an engine side of the casing, one of the casing and the housing being formed with an air communicating hole extending through an upper part of one of the casing and the housing, the casing and the housing including inner walls defining an air breather chamber in a region located above a joint between the casing and the housing and ranging from an upper side of the second shaft to an upper side of the first shaft and between the second shaft and the first shaft, the air breather chamber being formed with communicating parts at least at a position in the upper side of the first shaft and at a position between the second shaft and the first shaft, communicating with open air via the air communicating hole, and communicating with an inside part of the casing assembly via each of the communicating parts; and a side cover mounted on a non-engine side of the casing, the non-engine side and the engine side being opposite sides of the casing.

The other objects and features of this invention will become understood from the following description with reference to the accompanying drawings.

DETAILED DESCRIPTION OF THE INVENTION

Figure 1:
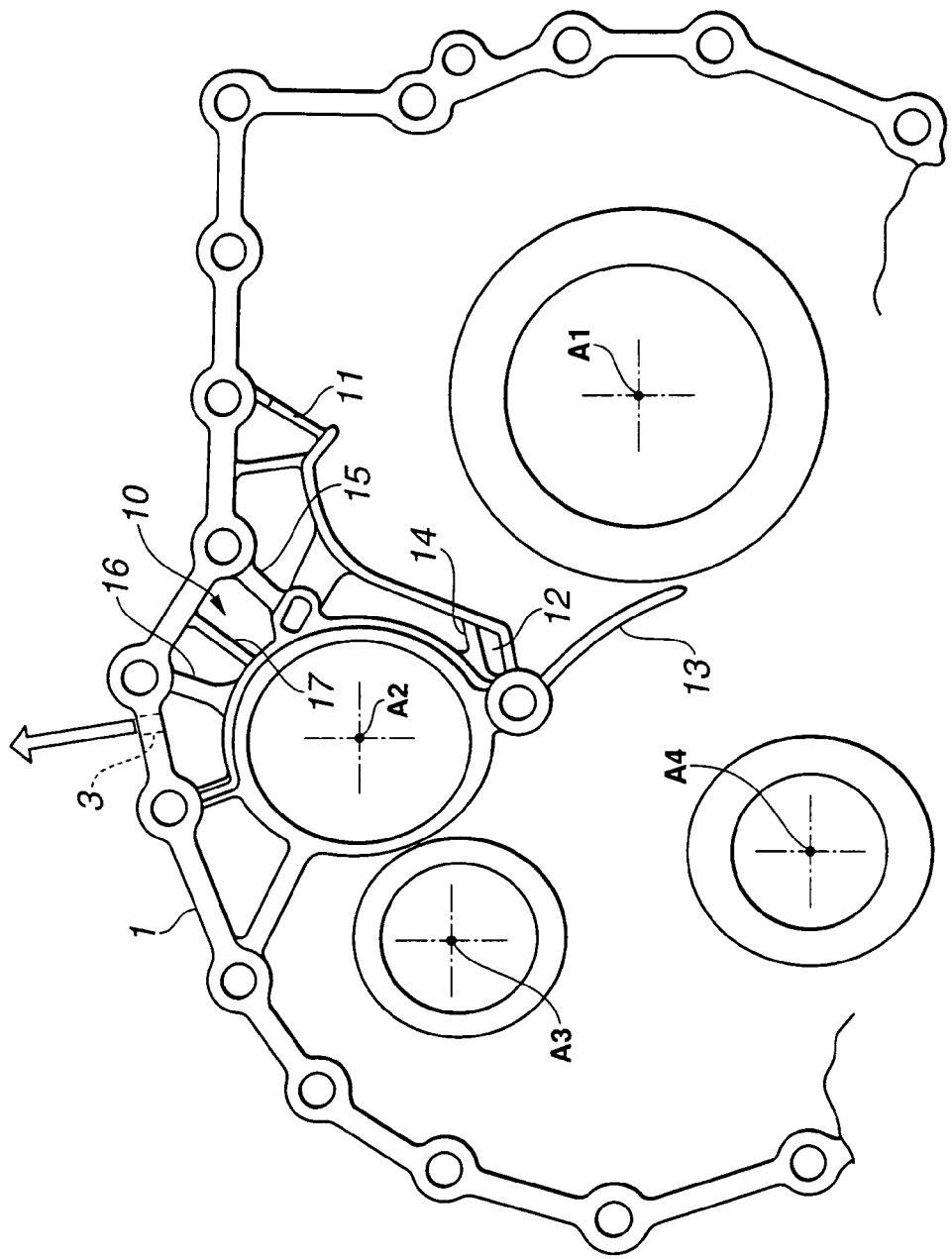
FIG. 1 is a diagrammatic view showing a joint of a casing to a housing in a belt continuously-variable transmission according to an embodiment of the present invention, as viewed from a direction of the housing.
Figure 2:
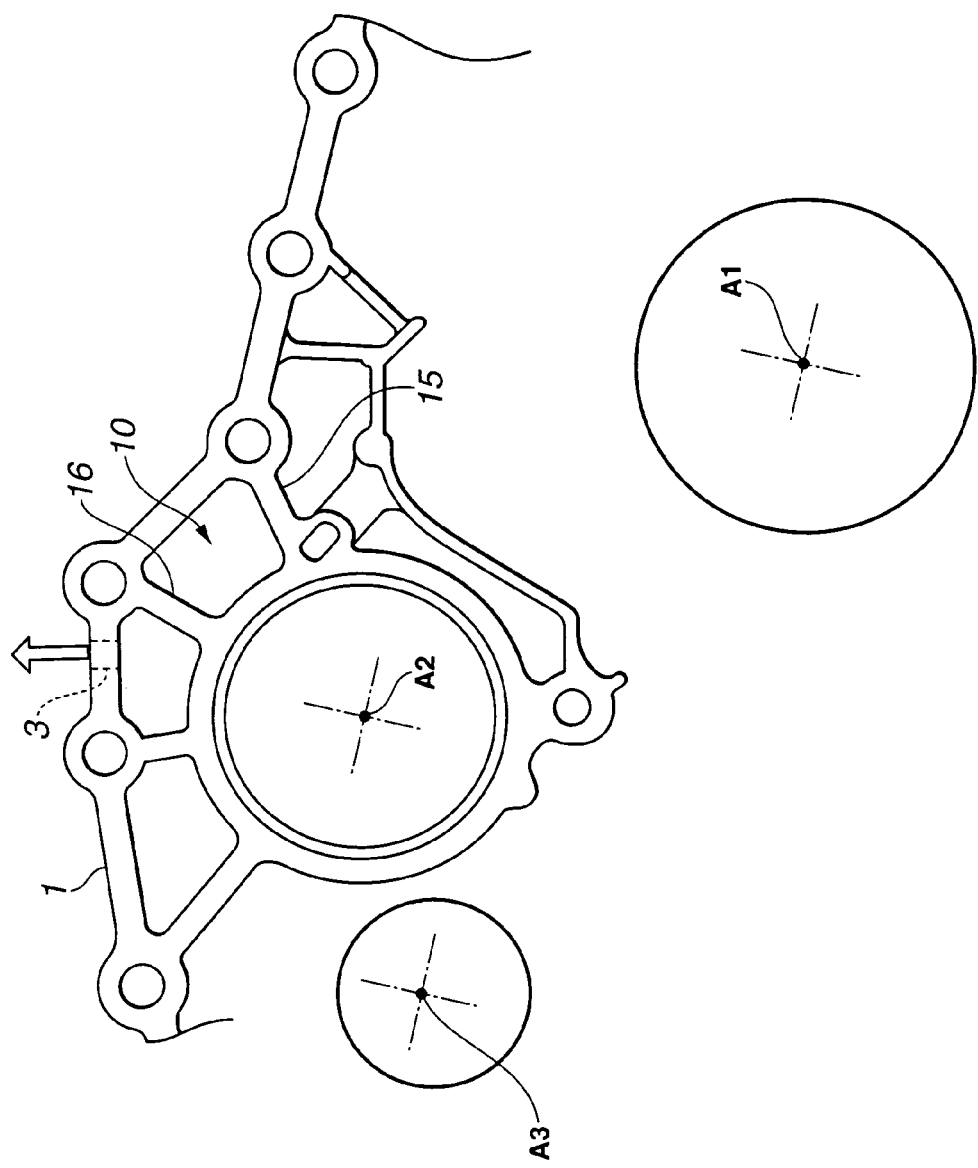
FIG. 2 is a partial diagrammatic view showing the casing of FIG. 1, as viewed from the direction of the housing.
Figure 3:
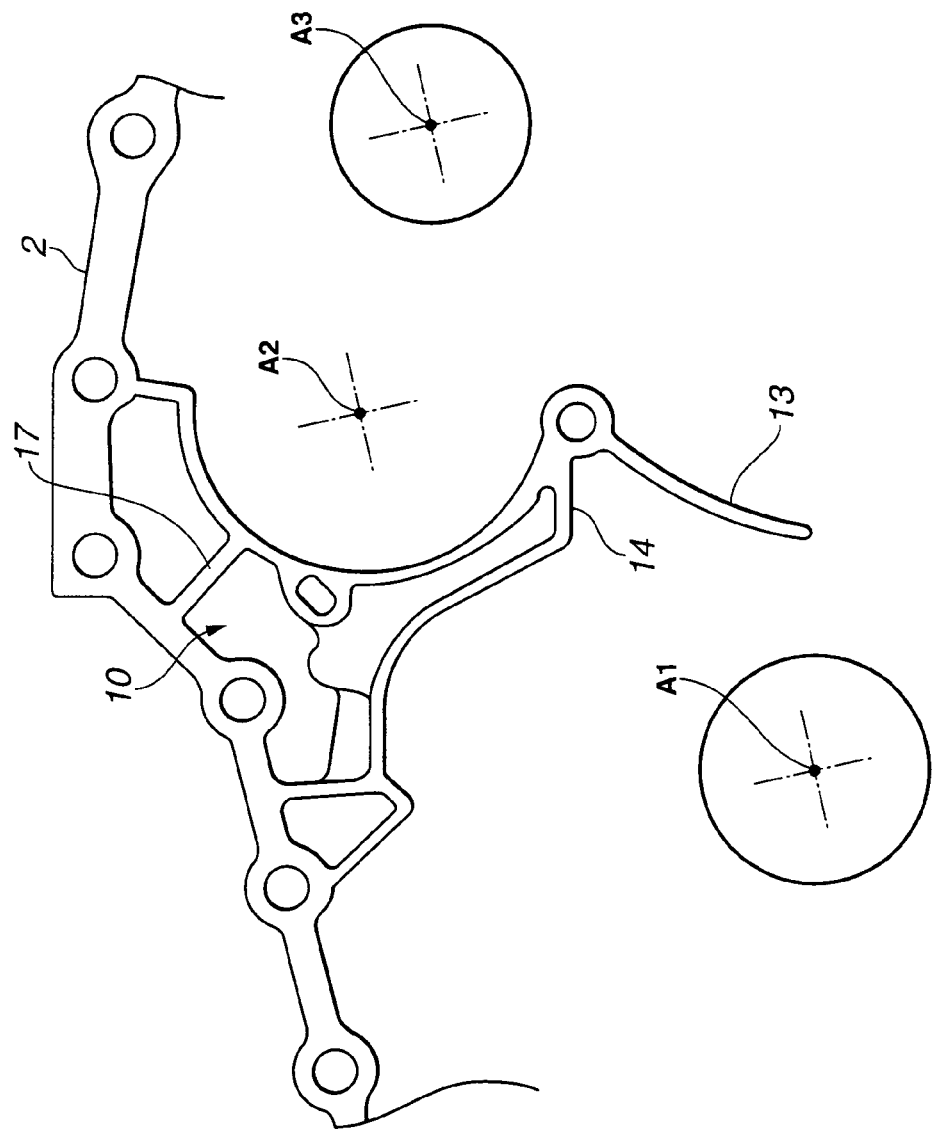
FIG. 3 is a partial diagrammatic view showing the housing of FIG. 1, as viewed from a direction of the casing.
Figure 4:
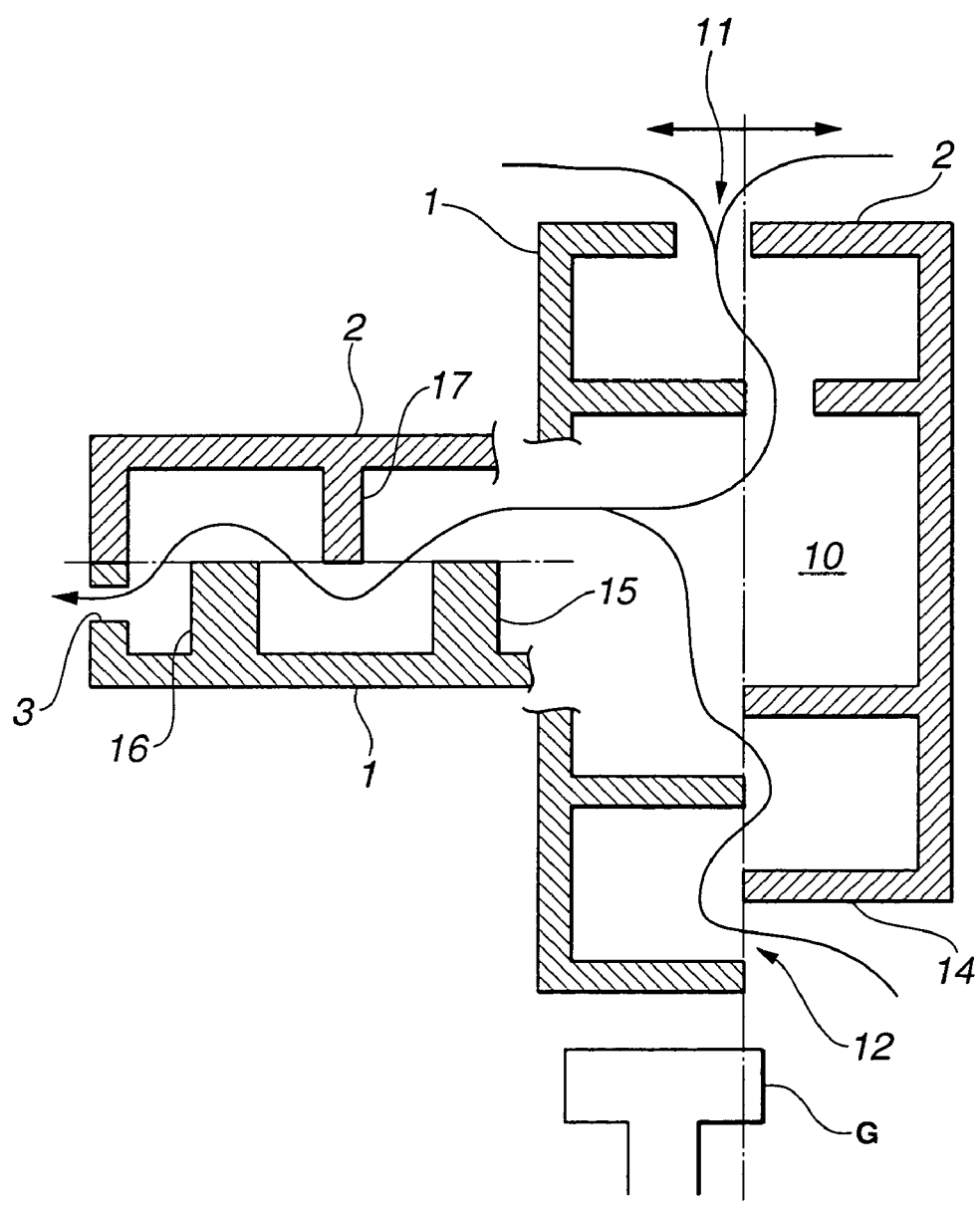
FIG. 4 is a schematic sectional view showing an air breather chamber of FIG. 1.
Figure 5:
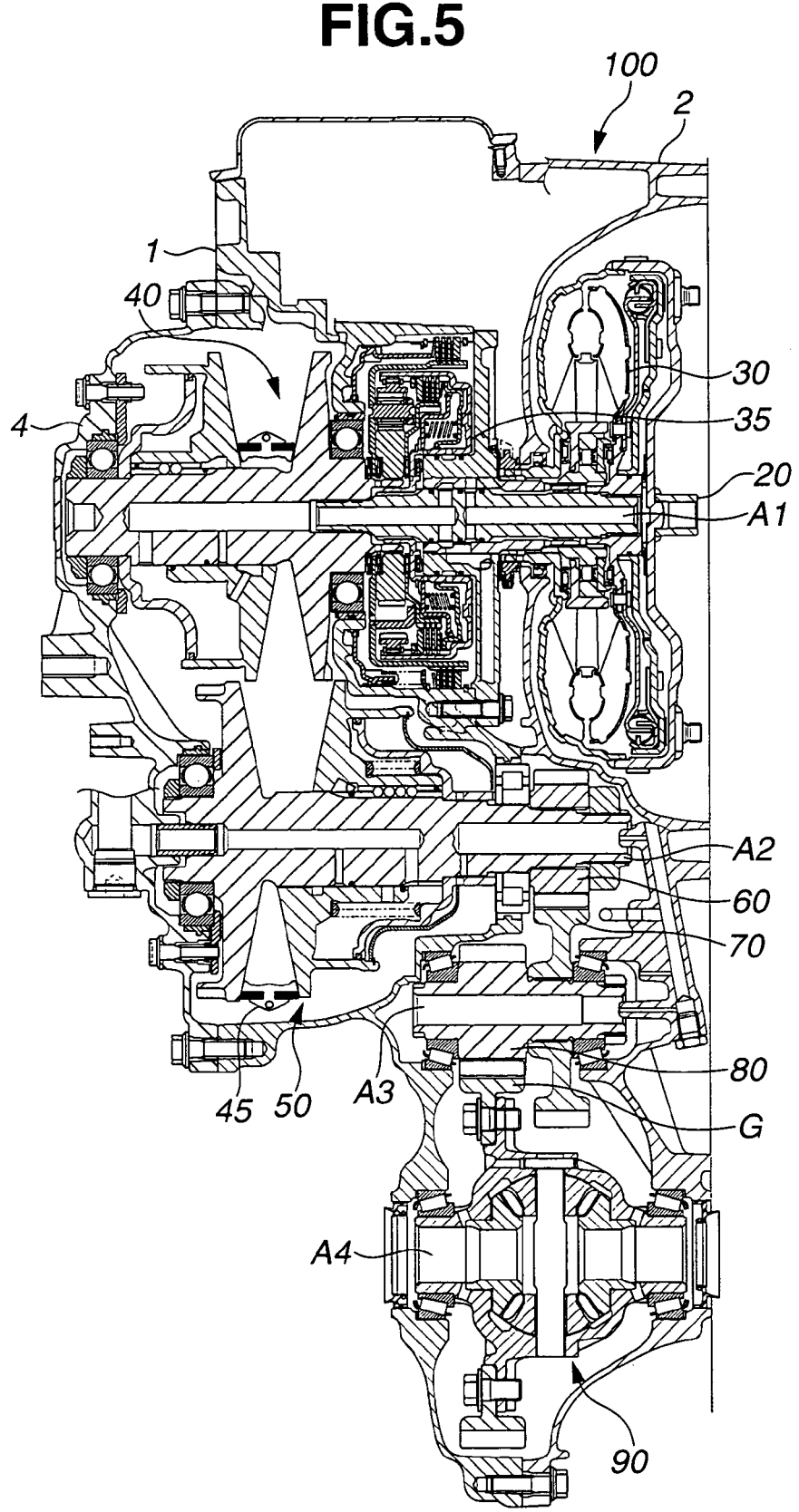
FIG. 5 is a sectional view showing the belt continuously-variable transmission according to this embodiment.

FIG. 1 is a diagrammatic view showing a joint of a casing to a housing in a belt continuously-variable transmission according to an embodiment of the present invention, as viewed from a direction of the housing. FIG. 2 is a partial diagrammatic view showing the casing as viewed from the direction of the housing. FIG. 3 is a partial diagrammatic view showing the housing as viewed from a direction of the casing. FIG. 4 is a schematic sectional view showing an air breather chamber. FIGS. 1~4 show the air breather chamber and elements relevant to description of the air breather chamber. FIG. 5 is a sectional view showing the belt continuously-variable transmission according to this embodiment.

As shown in FIGS. 1~5, the belt continuously-variable transmission includes a casing assembly 100 and first to fourth shafts A1~A4. The casing assembly 100 includes a casing 1 and a housing 2 defining an air breather chamber 10, and a side cover 4. The casing 1 is formed with an air communicating hole 3 extending through an upper part of the casing 1 and thereby exposing the air breather chamber 10 to open air. The air communicating hole 3 may be formed in the housing 2 so as to extend through an upper part of the housing 2. The fourth shaft A4 is provided with a final gear G of FIG. 4. The final gear G is located outside a differential gear mechanism 90, and is arranged to mesh with a hereinafter-described final drive gear 80. In this embodiment, the first shaft A1 is a drive shaft, and is coaxial with an output shaft 20 of an engine in an assembled state in a vehicle. The second shaft A2 is a driven shaft, and is parallel with the first shaft A1. The third shaft A3 is parallel with the second shaft A2. The fourth shaft A4 is parallel with the third shaft A3.

The belt continuously-variable transmission of this embodiment also includes a transmission mechanism 30, a drive pulley 40, a driven pulley 50, an output gear 60, an idler gear 70, the final drive gear 80 and the differential gear mechanism 90, in the casing assembly 100. The transmission mechanism 30 (such as a torque converter or an electromagnetic clutch) is provided on the first shaft A1, and is arranged to transmit rotation of the output shaft 20. The drive pulley 40 is located at a non-engine side of the transmission mechanism 30 on the first shaft A1, or an opposite side of the transmission mechanism 30 from the engine in the assembled state in the vehicle, and is arranged to be driven by an output of the transmission mechanism 30. The driven pulley 50 is provided on the second shaft A2, and is connected with the drive pulley 40 by a belt 45. The output gear 60 is located at an engine side of the driven pulley 50 on the second shaft A2, or between the driven pulley 50 and the engine in the assembled state in the vehicle, and is arranged to rotate integrally with the driven pulley 50. The idler gear 70 is provided on the third shaft A3, and is arranged to mesh with the output gear 60. The final drive gear 80 is provided on the third shaft A3, and is arranged to rotate integrally with the idler gear 70. The differential gear mechanism 90 is provided on the fourth shaft A4, and is arranged to be driven by the final drive gear 80.

The casing assembly 100 includes the casing 1, the housing 2, and the side cover 4. The housing 2 is mounted on an engine side of the casing 1 in a direction of the engine, or between the casing 1 and the engine in the assembled state in the vehicle. The side cover 4 is mounted on a non-engine side of the casing 1, or an opposite side of the casing 1 from the engine side or the engine in the assembled state in the vehicle. Besides, the belt continuously-variable transmission may also include a forward/reverse selector mechanism 35 between the transmission mechanism 30 and the drive pulley 40 on the first shaft A1.

The air breather chamber 10 is a labyrinthine space surrounded and thus defined by inner walls of the casing 1 and the housing 2 above a joint between the casing 1 and the housing 2. The air breather chamber 10 communicates with open air via the air communicating hole 3. In this embodiment, the air breather chamber 10 ranges in a region from an upper side of the second shaft A2 to an upper side of the first shaft A1 and between the second shaft A2 and the first shaft A1. The air breather chamber 10 is also formed with an upper or first communicating part 11 and a lower or second communicating part 12 respectively forming upper and lower or first and second openings each exposing the air breather chamber 10 to an inside part of the casing assembly 100. Thus, The air breather chamber 10 communicates with the inside part of the casing assembly 100 via each of the upper communicating part 11 and the lower communicating part 12. The upper communicating part 11 and the lower communicating part 12 are formed at least at a position in the upper side of the first shaft A1 and at a position between the second shaft A2 and the first shaft A1, respectively. The housing 2 is formed with a baffle plate portion 13 at a position in an under side of the lower communicating part 12, as shown in FIGS. 1 and 3. The baffle plate portion 13 blocks working fluid dispersed by a rotating part (such as the final gear G provided on the fourth shaft A4 in this embodiment) in the belt continuously-variable transmission, and thereby prevents the working fluid from entering into the lower communicating part 12.

FIG. 4 illustrates an internal structure of the air breather chamber 10 and a flow of air in the air breather chamber 10. As shown in FIGS. 1, 3 and 4, the housing 2 is formed with an inner wall 14 adjacent to the lower communicating part 12, and an inner wall 17 in proximity of the air communicating hole 3. As shown in FIGS. 1, 2 and 4, the casing 1 is also formed with inner walls 15 and 16 in proximity of the air communicating hole 3.

In case of an increase in pressure in the belt continuously-variable transmission, internal air in the belt continuously-variable transmission first flows into the air breather chamber 10 via the upper communicating part 11 and the lower communicating part 12 (or at least via the upper communicating part 11), then meanders through the inner walls in the air breather chamber 10 to the air communicating hole 3, and eventually is exhausted to the open air via the air communicating hole 3, as shown in FIG. 4. In case of a decrease in pressure in the belt continuously-variable transmission, the open air flows into the belt continuously-variable transmission in opposite course, i.e., the open air first flows into the air breather chamber 10 via the air communicating hole 3, then meanders through the inner walls in the air breather chamber 10 to the upper communicating part 11 and the lower communicating part 12 (or at least to the upper communicating part 11), and eventually flows into an inside part of the belt continuously-variable transmission (or into the inside part of the casing assembly 100). In case of dispersed working fluid having entered into the air breather chamber 10, the working fluid flows down to the lower communicating part 12 by gravity before reaching the air communicating hole 3, and then is drained or returned to inside of the belt continuously-variable transmission via the lower communicating part 12.

Such communicating parts each communicate with the inside part of the casing assembly to drain working fluid, having entered into the air breather chamber, smoothly from the air breather chamber back to the inside part of the casing assembly. If the air breather chamber is arranged to have a small capacity by being formed in a region ranging outside the second shaft and the third shaft with at least two such communicating parts, the air breather chamber is subject to problems in achieving a further downsizing or in improving an arrangement of the chamber. Firstly, if the air breather chamber is formed in the region ranging outside the second shaft to the third shaft, the transmission as a whole has a large size in a lateral direction to an extent of space located outside the third shaft in which the air breather chamber is provided. Secondly, if the air breather chamber is formed in the region ranging outside the second shaft to the third shaft, the space outside the third shaft cannot be effectively used. In recent years, such transmission as the belt continuously-variable transmission is required to have an outline as small as possible to improve collision safety, or safety in case of a collision of the vehicle. Thus, downsizing of such transmission has a practical importance.

By contrast, the belt continuously-variable transmission of this embodiment effectively uses a space at least in the upper side of the first shaft A1 and between the second shaft A2 and the first shaft A1 as the air breather chamber 10. Thus, in the belt continuously-variable transmission of this embodiment, the air breather chamber 10 is not located in a space outside the third shaft A3. Therefore, the belt continuously-variable transmission can be made small in size by an amount corresponding to the space outside the third shaft A3, or can use the space outside the third shaft A3 effectively for other purpose.

In the belt continuously-variable transmission of this embodiment, the air breather chamber 10 is formed with the two communicating parts 11 and 12 each communicating with the inside of the belt continuously-variable transmission. The present invention is also applicable when the air breather chamber is formed with three or more communicating parts each communicating with the inside of the belt continuously-variable transmission.

This application is based on a prior Japanese Patent Application No. 2004-104065 filed on Mar. 31, 2004. The entire contents of this Japanese Patent Application No. 2004-104065 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A belt continuously-variable transmission comprising:
   a transmission mechanism provided on a first shaft coaxial with an engine output shaft, and arranged to transmit rotation of the engine output shaft;
   a drive pulley provided on the first shaft, located at a non-engine side of the transmission mechanism, and arranged to be driven by an output of the transmission mechanism;
   a driven pulley provided on a second shaft parallel with the first shaft, and connected with the drive pulley by a belt;
   an output gear provided on the second shaft, located at an engine side of the driven pulley, and arranged to rotate integrally with the driven pulley;
   an idler gear provided on a third shaft parallel with the second shaft, and arranged to mesh with the output gear;
   a final drive gear provided on the third shaft, and arranged to rotate integrally with the idler gear;
   a differential gear mechanism provided on a fourth shaft parallel with the third shift, and arranged to be driven by the final drive gear;
   a final gear provided on the fourth shaft outside the differential gear mechanism, and arranged to mesh with the final drive gear; and
   a casing assembly housing the transmission mechanism, the drive pulley, the driven pulley, the output gear, the idler gear, the final drive gear, the differential gear mechanism and the final gear and including: a casing; a housing mounted on an engine side of the casing, one of the casing and the housing being formed with an air communicating hole extending through an upper part of one of the casing and the housing, the casing and the housing including inner walls defining an air breather chamber in a region located above a joint between the casing and the housing, spanning an entire distance between an upper side of the second shaft which is directly above the second shaft and an upper side of the first shaft which is directly above the first shaft, and ranging between the second shaft and the first shaft, the air breather chamber being formed with the air communicating hole, an upper communicating opening exposing the air breather chamber to an upper inside part of the casing assembly, and a lower communicating opening exposing the air breather chamber to a lower inside part of the casing assembly; and a side cover mounted on a non-engine side of the casing, the non-engine side and the engine side being opposite sides of the casing,
   wherein the housing is formed with a baffle plate portion located between the lower communicating opening and the final gear proximate to the under side of the lower communicating opening and arranged to prevent a working fluid dispersed by the final gear from entering into the lower communicating opening formed at the position between the second shaft and the first shaft.

2. The belt continuously-variable transmission as claimed in claim 1, wherein the first shaft is a drive shaft, and the second shaft is a driven shaft driven by the first shaft.

3. The belt continuously-variable transmission as claimed in claim 1, wherein the housing is formed with the baffle plate portion located at a position in an under side of the lower communicating opening formed at a position between the second shaft and the first shaft.

4. The belt continuously-variable transmission as claimed in claim 1, wherein the air breather chamber spans the entire distance between the upper side of the second shaft which is directly above the second shaft and the upper side of the first shaft which is directly above the first shaft, and ranges between the second shaft and the first shaft, in a surface perpendicular to an axial direction of the first shaft.

5. The belt continuously-variable transmission as claimed in claim 1, wherein the upper and lower communicating openings are located at the position in the upper side of the first shaft which is directly above the first shaft and at the position between the second shaft and the first shaft, in a surface perpendicular to an axial direction of the first shaft.

6. The belt continuously-variable transmission as claimed in claim 1, wherein the air breather chamber includes a first chamber portion spanning the entire distance between the upper side of the second shaft which is directly above the second shaft and the upper side of the first shaft which is directly above the first shaft, and a second chamber portion connected with the first chamber portion, and sandwiched between the second shaft and the first shaft.

7. The belt continuously-variable transmission as claimed in claim 6, wherein the second chamber portion of the air breather chamber includes a first end portion connected with the first chamber portion of the air breather chamber, and a second end portion, wherein the lower communicating opening is formed at the second end portion of the second chamber portion.

8. A belt continuously-variable transmission comprising:
   a transmission mechanism provided on a first shaft coaxial with an engine output shaft, and arranged to transmit rotation of the engine output shaft;
   a drive pulley provided on the first shaft, located at a non-engine side of the transmission mechanism, and arranged to be driven by an output of the transmission mechanism;
   a driven pulley provided on a second shaft parallel with the first shaft, and connected with the drive pulley by a belt;
   an output gear provided on the second shaft, located at an engine side of the driven pulley, and arranged to rotate integrally with the driven pulley;
   an idler gear provided on a third shaft parallel with the second shaft, and arranged to mesh with the output gear;
   a final drive gear provided on the third shaft, and arranged to rotate integrally with the idler gear;
   a differential gear mechanism provided on a fourth shaft parallel with the third shaft, and arranged to be driven by the final drive gear;
   a final gear provided on the forth shaft outside the differential gear mechanism, and arranged to mesh with the final drive gear; and
   a casing assembly housing the transmission mechanism, the drive pulley, the driven pulley, the output gear, the idler gear, the final drive gear, the differential gear mechanism and the final gear and including:
   a casing formed with an air communicating hole extending through an upper part of the casing; and
   a housing mounted on an engine side of the casing, the casing and the housing internally defining an air breather chamber in a region located above a joint between the casing and the housing, spanning an entire distance between an upper side of the first shaft which is directly above the first shaft and an upper side of the second shaft which is directly above the second shaft, and ranging between the second shaft and the first shaft, the air breather chamber being formed with the air communicating hole, a first communicating opening, and a second communicating opening respectively at a position in the upper side of the first shaft and at a position between the second shaft and the first shaft, the first communicating opening exposing the air breather chamber to an upper inside part of the casing assembly, the second communicating opening exposing the air breather chamber to a lower inside part of the casing assembly, and the air communicating hole exposing the air breather chamber to open air, wherein the housing is formed with a baffle plate portion located between the second communicating opening and the final gear proximate to the under side of the second communicating opening and arranged to prevent a working fluid dispersed by the final gear from entering into the second communicating opening formed at the position between the second shaft and the first shaft.

9. The belt continuously-variable transmission as claimed in claim 8, further comprising a side cover mounted on a non-engine side of the casing, the non-engine side and the engine side being opposite sides of the casing.

* * * * *